US010379510B2

United States Patent
Huang et al.

(10) Patent No.: US 10,379,510 B2
(45) Date of Patent: Aug. 13, 2019

(54) COMMAND CONTROL IN A MULTI-SERVO FEEDBACK CONTROL SYSTEM

(71) Applicant: UBTECH Robotics Corp., Shenzhen (CN)

(72) Inventors: Tingshuang Huang, Shenzhen (CN); Lifu Zhang, Shenzhen (CN); Youjun Xiong, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 303 days.

(21) Appl. No.: 15/394,824

(22) Filed: Dec. 30, 2016

(65) Prior Publication Data
US 2018/0052435 A1    Feb. 22, 2018

(30) Foreign Application Priority Data
Aug. 18, 2016   (CN) .......................... 2016 1 0683114

(51) Int. Cl.
  *G05B 19/04*   (2006.01)
  *G05B 19/042*  (2006.01)
(52) U.S. Cl.
  CPC ..... *G05B 19/0426* (2013.01); *G05B 19/0423* (2013.01); *G05B 2219/34013* (2013.01)
(58) Field of Classification Search
  CPC ............ G05B 19/0426; G05B 19/0423; G05B 2219/34013
  See application file for complete search history.

(56) References Cited

U.S. PATENT DOCUMENTS

| | | | | | |
|---|---|---|---|---|---|
| 3,886,423 | A | * | 5/1975 | Masuzawa | G05B 5/01 318/621 |
| 4,310,878 | A | * | 1/1982 | Hyatt | B60R 16/0373 318/608 |
| 4,315,200 | A | * | 2/1982 | Yamada | G05B 19/232 318/571 |
| 4,398,242 | A | * | 8/1983 | Buus | G05D 1/0077 244/194 |
| 4,511,830 | A | * | 4/1985 | Yamada | G05B 19/232 318/257 |
| 5,268,898 | A | * | 12/1993 | Kazato | H04L 12/423 318/562 |
| 5,359,271 | A | * | 10/1994 | Husher | H02P 8/22 318/685 |
| 6,384,561 | B1 | * | 5/2002 | Niizuma | G05B 9/03 318/563 |

(Continued)

*Primary Examiner* — Mohammad Ali
*Assistant Examiner* — Kelvin Booker (57) ABSTRACT

The present disclosure discloses a command control in a multi-servo feedback control system. The command control includes: a servo acquiring preset delay time when a first action command is received from a main controller via serial data bus; the servo sending feedback information to the main controller after the preset delay time; wherein the preset delay time of the plurality of servos are different from each other, and the feedback information is configured to identify work status of the servo; receiving a second action command from the main controller; performing actions corresponding to the second action command and sending the feedback information to the main controller after the preset delay time if the second action command is valid. A servo and a multi-servo feedback control system for performing the command control are also provided.

19 Claims, 6 Drawing Sheets

(56) References Cited

U.S. PATENT DOCUMENTS

| | | | | |
|---|---|---|---|---|
| 6,430,634 B1* | 8/2002 | Mito | G05B 19/042 | |
| | | | 710/100 | |
| 6,590,358 B1* | 7/2003 | Tsutsui | G05B 5/01 | |
| | | | 318/560 | |
| 6,792,330 B1* | 9/2004 | Matsumoto | G05B 19/4141 | |
| | | | 700/114 | |
| 7,199,956 B1* | 4/2007 | Moser | G11B 5/59666 | |
| | | | 360/32 | |
| 2002/0110155 A1* | 8/2002 | Pearce | H04J 3/0682 | |
| | | | 370/519 | |
| 2002/0191503 A1* | 12/2002 | Kataoka | G01B 11/026 | |
| | | | 369/44.29 | |
| 2004/0135534 A1* | 7/2004 | Cullen | G05B 17/02 | |
| | | | 318/609 | |
| 2006/0031001 A1* | 2/2006 | Snowbarger | G05B 5/00 | |
| | | | 701/114 | |
| 2006/0186849 A1* | 8/2006 | Iwashita | G05B 19/406 | |
| | | | 318/576 | |
| 2006/0271232 A1* | 11/2006 | Toyama | G05B 19/21 | |
| | | | 700/166 | |
| 2006/0282181 A1* | 12/2006 | Weinhofer | G05B 19/06 | |
| | | | 700/83 | |
| 2009/0219641 A1* | 9/2009 | Harmer | G11B 5/59627 | |
| | | | 360/71 | |
| 2010/0125343 A1* | 5/2010 | Hung | G08C 19/00 | |
| | | | 700/3 | |
| 2013/0049670 A1* | 2/2013 | Terada | H04L 12/40013 | |
| | | | 318/601 | |
| 2015/0032247 A1* | 1/2015 | Hashizume | G05B 19/4063 | |
| | | | 700/159 | |

* cited by examiner

FIG. 1

| FCS | N# | N-1# | ... ... | 3# | 2# | 1# | Head |

COMMAND CONTROL IN A MULTI-SERVO FEEDBACK CONTROL SYSTEM

CROSS REFERENCE TO RELATED APPLICATIONS

This application claims priority to Chinese Patent Application No. 201610683114.X. filed Aug. 18, 2016, which is hereby incorporated by reference herein as if set forth in its entirety.

BACKGROUND

1. Technical Field

The present disclosure relates to automatic control system, and particularly to a command control in a multi-servo feedback control system, a servo and a multi-servo feedback control system.

2. Description of Related Art

With the development of automation control technique, servo has widely been used in robot, laser machining and numerically controlled machine tool. A servo generally includes a housing, an electric motor, a reduction gear set, a position sensor, an output shaft, etc. The servo controls the rotation of the output shaft by controlling the motor. For example, robot simulates joint movement by controlling the motor of servo moving to accomplish different actions.

In the present servo control system, generally, communication interfaces of a main controller are connected in series with a plurality of servos. The main controller sends action command to every servo connected to the each interface of the main controller. At present, each servo sends feedback information to the main controller simultaneously after receiving the action command from the main controller. This will usually result in bits conflict and thus the main controller can not receive the feedback information from the each servo correctly.

SUMMARY

The present disclosure discloses a command control in a multi-servo feedback control system including a main controller and a plurality of servos electrically connected to the main controller. The command control includes: sending, from the main controller, a first action command to the servos via serial data bus, acquiring preset delay time by the servos, performing actions by the servos according to the first action command, and sending feedback information by the servos to the main controller after the preset delay time, wherein the preset delay time of the plurality of servos are different from each other, the feedback information is configured to identify work status of the servos; sending, from the main controller, a second action command, and determining, by the servos, whether the second action command is valid; in response to the actions corresponding to the first action command being not performed by one of the servos, determining that second action command is valid, performing, by said one of the servos, actions corresponding to the second action command, and sending the feedback information to the main controller after the preset delay time; and in response to the actions corresponding to the first action command being performed by the servos, determining that the second action command is not valid, and masking the second action command, by the servos; wherein the second action command is sent by the main controller, in response to the feedback information from any one of the servos are not fully received by the main controller within a preset time period after the first action command is sent.

Other objects, advantages and novel features of the invention will become more apparent from the following detailed description when taken in conjunction with the accompanying drawings.

BRIEF DESCRIPTION OP THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment and such references can mean "at least one" embodiment.

It should be understood that, when used in this specification and the appended claims, the term "comprising" and "comprise" indicates the described features, integers, steps, operations, elements, and/or components, hut does not exclude one or more other features, integers, steps, operations, elements, components, and/or the presence or addition collection.

It should also be understood that the terminology in this specification, the present invention is used merely for the purpose of describing particular embodiments only and is not intended to limit the present invention. As used in this specification and the appended claims in the hook claim as used herein, unless the contest clearly indicates otherwise, the singular forms "a", "an" and "the" are intended to include the plural forms.

It is further understood that the present description and the appended claims, the term "and/or" associated item listed in a combination of any and all possible combinations of one or more of the means, and these include combinations.

As so, the terms used in this specification and the appended claims "if" can be interpreted as depending on the context "when" or "Once" or "in response to determining" or "in response to detected". Similarly, the phrase "if it is determined" or "if [a stated condition or event]", depending on the context can be interpreted to mean "Once" or "in response to determining" or "upon detecting [described condition or event]" or "in response to the detection of [described condition or event]".

Embodiment 1

Figure 1:
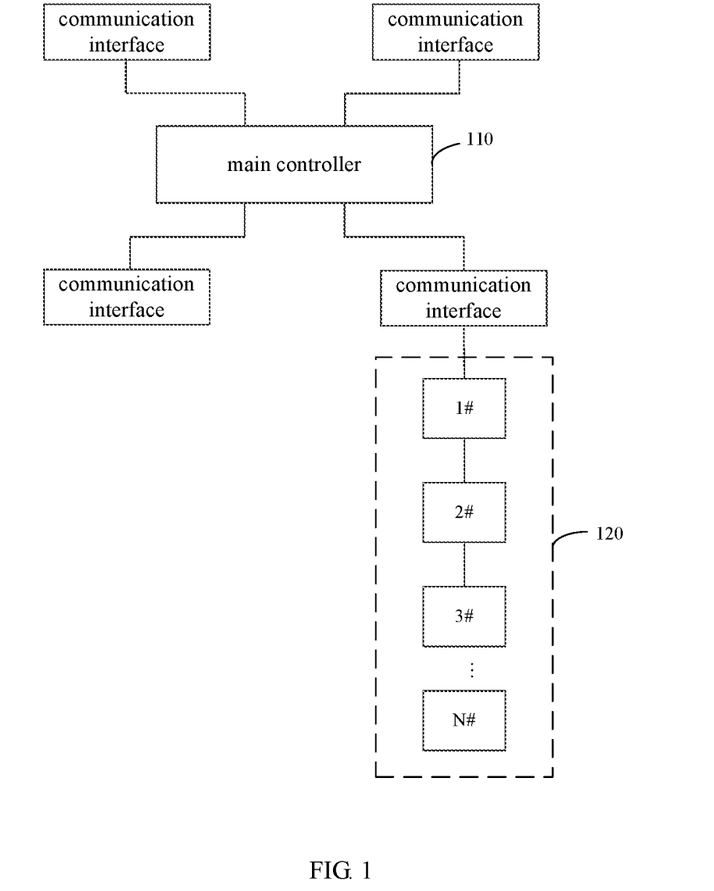
FIG. 1 is a schematic diagram of a first embodiment of a multi-servo feedback control system in accordance with the present disclosure.

Referring to FIG. 1, a schematic diagram of a first embodiment of a multi-servo feedback control system in accordance with the present disclosure. As shown in FIG. 1, the multi-servo feedback control system includes: a main controller 110 and a plurality of servos 110 connected in series with the main controller 110.

The main controller 110 sends a first action command to the plurality of servos that are connected in series with the main controller. When receiving the first action command, the servo acquires a preset delay time and sends feedback information to the main controller according to the preset delay time. Each servo corresponds to a different preset delay time.

In the present embodiment, the multi-servo feedback control system includes the main controller and the plurality of servos. Specifically, the servo is connected to communication interface of the main controller. As shown in FIG. 1, a communication interface of the main controller is connected in series with the plurality of servos, such as 1#servo, 2#servo, 3#servo, . . . N#servo. N is a positive integer. Equally, other communication interfaces of the main controller can also be connected in series with the plurality of servos.

In the multi-servo feedback control system, the main controller sends the first action command to the servo via the Universal Serial Bus (USB). For example, the main controller sends the first action command to the servo through the Universal Asynchronous Receiver/Transmitter (UART). The main controller sends the action command that contains an identity information (ID) of a target servo to one or more servo. After the action command was received, the servo acquires action information corresponding to the ID according to the ID contained in the action command.

Figure 2:
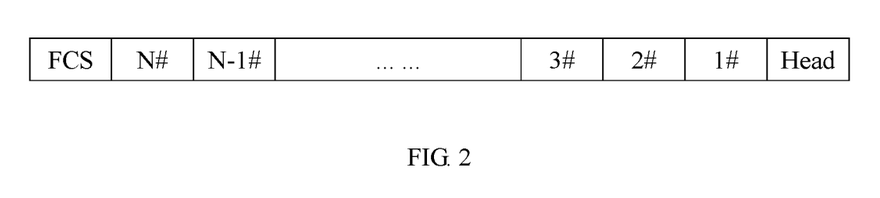
FIG. 2 is a schematic diagram of a first action command sent by a main controller to a plurality of servos of a first embodiment of the multi-servo feedback control system in accordance with the present disclosure.

Referring to FIGS. 1 and 2. FIG. 2 is a schematic diagram of the first action command sent by the main controller in accordance with the present disclosure.

The first action command contains specific information that is used for controlling actions of the servo, such as rotation angle information of the servo. The first action command is sent in the form of command frame. FIG. 2 shows the first action command sent by the main controller to 1#servo, . . . and N#servo. The first action command can contain ID and action information of each servo. Each servo receives the first action command and acquires the action information corresponding to the ID contained in the first action command.

The servo acquires the preset delay time after receiving the first action command from the main controller via the serial data bus. The preset delay time can be set according to actual needs. Each different servo corresponds to the different preset delay time, for example, 1#servo corresponds to 1 ms (millisecond), 2#servo corresponds to 2 ms, . . . N#servo corresponds to Nms.

The servo sends feedback information to the main controller according to the preset delay time after acquiring the preset delay time. The feedback information is used to identify work status of the servo, for example, the feedback information can be a notification message that the first action command has been received by fee servo, and the feedback information also can be another notification message that the first action command has been received by the servo and the servo will execute the first action command.

Optionally, the main controller also sends a second action command to at least one of the servos. The main controller sends the second action command when the feedback information has not been fully received from all the servos within a preset time period after the first action command was sent. The second action command is the same as the first action command.

After sending the first action command to the plurality of servos, if the feedback information has not been fully received from the plurality of servos within the preset time period, the main controller determines that there is at least one servo which hasn't received the first action command. The main controller sends the same action command as the first action command to the plurality of servos again. The preset time can be set according to actual needs. For example, if assuming the preset time is Nms, the main controller sends the second action command when the feedback information is not received from any one or more of the servos 1#~N# within the preset time period Nms after sending the first action command to servos 1#~N#. The second action command is the same as the first action command so that all the servos can receive the first action command correctly and perform the actions corresponding to the first action command.

If the servo has performed the actions corresponding to the first action command after receiving the second action command from the main controller, the servo can mask the second action command received and no longer execute the second action command.

Optionally, when the number of times the second action command has been sent by the main controller exceeds a preset alarm value, if the feedback information has not been fully received from all the servos, the main controller also outputs an error command.

If the feedback information has not been fully received from all the servos, when the number of times the second action command has been sent by the main controller exceeds the preset alarm value, the main controller will produce error messages to alert users that there is an error. Specifically, the main controller outputs the error command.

The preset alarm value can fee set according to actual needs. For example, setting the preset alarm value to 3. If the feedback information has not been fully received from all the servos after sending the second action command three times, the main controller sends the error command to alert users that there is probably an error.

The error command can fee caught by a preset program and output by alarm with sound through the preset program. The error command also can be output by sending alarm information to corresponding upper computer. There are many forms of giving the alarm through the error command. The specific form can be selected according to actual needs.

In the present embodiment, the main controller sends the first action command to the plurality of servos that are connected in series with the main controller. After receiving the first action command, the servo acquires the preset delay time and sends feedback information to the main controller according to the preset delay time. Each servo corresponds to a different preset delay time. Each servo of the multi-servo feedback control system corresponds to the different preset delay time, and the servo sends feedback information to the main controller according to the corresponding preset delay time, and therefore the bus conflict of the multi-servo feedback control system can be avoided.

If the main controller has not fully received the feedback information from all the servos within the preset time period, the main controller sends the second action again to make every servo can perform the actions corresponding to the first action command, thereby enhancing communication stability. If the feedback information has not been fully received from all the servos when the number of times the second action command has been sent exceeds the preset alarm value, the main controller outputs the error command. It can give the users a timely reminder that there is an error to enable the users to find out and solve problems timely.

Embodiment 2

Figure 3:
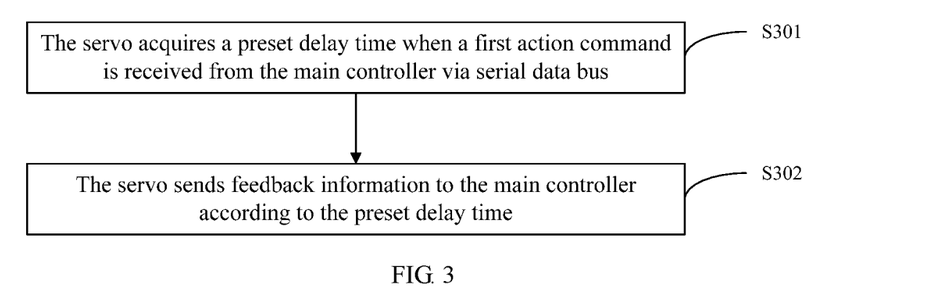
FIG. 3 is a flowchart of a second embodiment of a command control for the multi-servo feedback control system in accordance with the present disclosure.

Referring to FIG. 3, a flowchart of a second embodiment of a command control in the multi-servo feedback control system in accordance with the present disclosure. In the present embodiment, executive body of the command control is the servo. As shown in FIG. 3, the command control includes the following steps.

In step S301, the servo acquires a preset delay time when a first action command is received from the main controller via serial data bus. The multi-servo feedback control system includes the main controller and a plurality of servos. Each servo corresponds to a different preset delay time.

Referring to FIGS. 1-3. FIG. 1 is the schematic diagram of the multi-servo feedback control system, and FIG. 2 is the schematic diagram of the first action command sent by the main controller.

In the present embodiment, the multi-servo feedback control system includes the main controller and the plurality of servos. Specifically, the servo is connected to communication interface of the main controller. FIG. 1 shows a communication interface of the main controller is connected in series with the plurality of servos, such as 1#servo, 2#servo, 3#servo, . . . N#servo. N is a positive integer. Equally, other communication interfaces of the main controller can also be connected in series with the plurality of servos.

In the multi-servo feedback control system, the main controller sends the first action command to the servo via the USB. For example, the main controller sends the first action command to the servo through the UART. The main controller sends the action command that contains the ID of the target servo to one or more servo. After the action command was received, the servo acquires action information corresponding to the ID according to the ID contained in the action command.

The first action command contains specific information that is used for controlling actions of the servo, such as rotation angle information of the servo. The first action command is sent in the form of command frame. FIG. 2 shows the first action command sent by the main controller to 1#servo, . . . and N#servo. The first action command can contain ID and action, information of each servo. Each servo receives the first action command and acquires the action information corresponding to the ID contained in the first action command.

The servo acquires the preset delay time after receiving the first action command from the main controller via the serial data bus. The preset delay time can be set according to actual needs. Each different servo corresponds to the different preset delay time. For example, 1#servo corresponds to 1 ms (millisecond), 2#servo corresponds to 2 ms, . . . N#servo corresponds to Nms.

In step S302, the servo sends feedback information to the main controller according to the preset delay time. The feedback information is used to identify work status of the servo.

The servo sends feedback information to the main controller according to the preset delay time after acquiring the preset delay time. The feedback information, is used to identify work status of the servo. Specifically, the work, status of the servo can be a first status that the first action command has been received by the servo. The work status of the servo can be a second status that the servo can work properly and will execute the first action command. The work status of the servo can be a third status that the servo can not perform the actions corresponding to the first action command. For example, the feedback information can be a notification message that the first action command has been received by the servo. The feedback information also can be another notification message that the first action command has been received by the servo and the servo will execute the first action command.

In the present embodiment, when the first action command is received from the main controller via serial data bus, the servo acquires a preset delay time. The multi-servo feedback control system includes the main controller and the plurality of servos. Each servo corresponds to the different preset delay time. The servo sends feedback information to the main controller according to the preset delay time. The feedback information is used to identify work status of the servo. Each servo corresponds to the different preset delay time, and the servo sends feedback information to the main controller according to the corresponding preset delay time, and therefore the bus conflict can be avoided.

Figure 4:
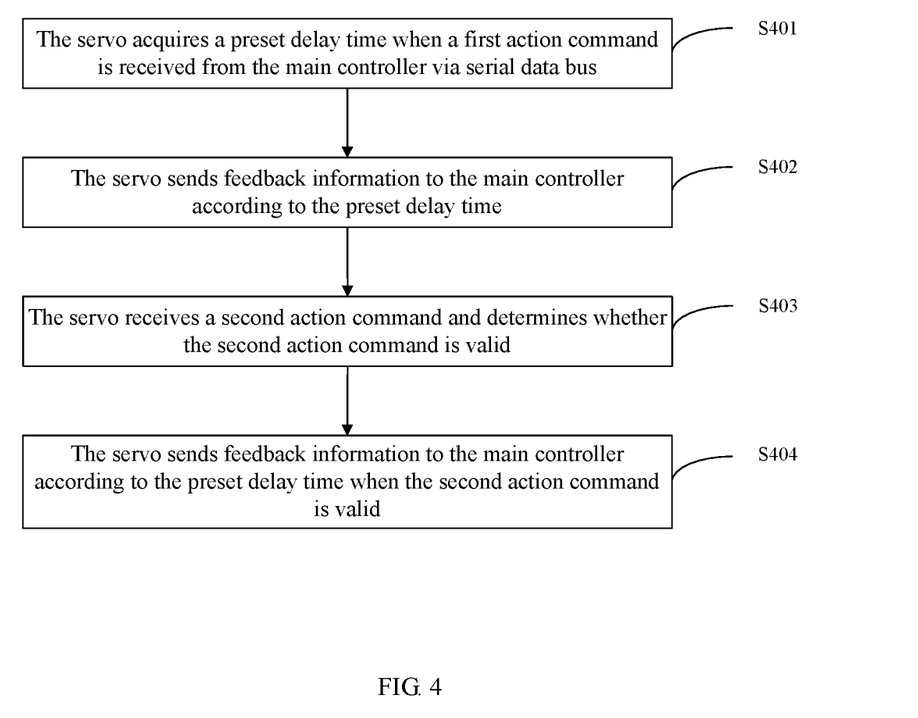
FIG. 4 is a flowchart of a third embodiment of a command control for the multi-servo feedback control system in accordance with the present disclosure.

Referring to FIG. 4, a flowchart of a third embodiment of a command control in the multi-servo feedback control system in accordance with the present disclosure. In the present embodiment, executive body of the command control is the servo. As shown in FIG. 4, the command control includes the following steps.

In step S401, the servo acquires a preset delay time when a first action command is received from the main controller via serial data bus. The multi-servo feedback control system includes the main controller and a plurality of servos. Each servo corresponds to a different preset delay time.

Referring to FIGS. 1, 2 and 4, FIG. 1 is the schematic diagram of the multi-servo feedback control system, and FIG. 2 is the schematic diagram of the first action command sent by the main controller.

In the present embodiment, the multi-servo feedback control system includes the main controller and the plurality of servos. Specifically, the servo is connected to communication interface of the main controller. FIG. 1 shows a communication interface of the main controller is connected in series with the plurality of servos, such as 1#servo, 2#servo, 3#servo, . . . N#servo. N is a positive integer. Equally, other communication interfaces of the main controller can also be connected in series with the plurality of servos.

In the multi-servo feedback control system, the main controller sends the first action command to the servo via the USB. For example, the main controller sends the first action command to the servo through the UART. The main controller sends the action command that contains the ID of a target servo to one or more servo. After the action command was received, the servo acquires action information corresponding to the ID according to the ID contained in the action command.

The first action command contains specific information used for controlling actions of the servo, such as rotation angle information of the servo. The first action command is seat in the form of command frame. FIG. 2 shows the first-action command sent by the main controller to 1#servo, . . . and N#servo. The first action command can contain ID and action information of each servo. Each servo receives the first action, command and acquires the action information corresponding to the ID contained in the first action command.

The servo acquires the preset delay time after receiving the first action command from the main controller via the serial data bus. The preset delay time can be set according to actual needs. Each different servo corresponds to the different preset delay time. For example, 1#servo corresponds to 1 ms (millisecond), 2#servo corresponds to 2 ms, . . . N#servo corresponds to Nms.

In step S402, the servo sends feedback information to the main controller according to the preset delay time. The feedback information is used to identify work status of the servo.

The servo sends feedback information to the main controller according to the preset delay time after acquiring the preset delay time. The feedback information is used to identity work status of the servo. For example, the feedback information can be a notification message that the first action command has been received by the servo. The feedback information also can be another notification message that the first action command has been received by the servo and the servo will execute the first action command.

In step S403, the servo receives a second action command and determines whether the second action command is valid. The main controller sends the second action command again when the feedback information has not been fully received from all the servos within the preset time period after the first action command was sent by the main controller to the plurality of servos. The second action command is the same as the first action command.

After the second action command was received, the servo determines whether the second action command is valid. The main controller sends the second action command when the feedback information has not been fully received from all the servos within the preset lime period after sending the first action command to the plurality of servos. The preset time can be set according to actual needs. For example, if assuming the preset time is Nms, the main controller sends the first action command again when the feedback information is not received from any one or more of the plurality of servos within the preset time period Nms after sending the first action command to the plurality of servos. When the servo receives the second action command, the servo determines whether the second action command is valid.

In step S404, the servo sends feedback information to the main controller according to the preset delay time when the second action command is valid.

Specifically, the servo acquires a corresponding delay time and sends the feedback information to the main controller according to the corresponding delay time when the second action command is valid.

If the feedback information has not been fully received from all the servos when the number of times the second action command has been sent exceeds a preset alarm value, the main controller further outputs the error command.

If the feedback information has not been fully received from all the servos when the number of times the second action command has been sent exceeds a preset alarm value, the main controller will produce error messages to alert users that there is an error. Specifically, the main controller outputs the error command.

The preset alarm value can be set according to actual needs. For example, setting the preset alarm value to 3. If the feedback information has not been fully received from all the servos after sending the second action command three times, the main controller sends the error command to alert users that there is probably an error.

The error command can be caught by a preset program to sound the alarms. The error command also can be output by sending alarm information to corresponding upper computer. There are many forms of giving the alarm through the error command. The specific form can be selected according to actual needs.

In one embodiment, step S403 further includes: the servo determining whether the servo is performing actions corresponding to the first action command; the servo determining that the second action command is not valid and masking the second action command when the servo is performing the actions corresponding to the first action command.

The servo determines whether the second action command is valid, after receiving the second action command. Specifically, the servo whether the second action command is valid by determining whether the servo is performing actions corresponding to the first action command.

Specifically, the servo determines whether the servo is performing actions. When the servo is performing actions, the servo determines whether the servo is performing actions corresponding to the first action command by determining whether the ID corresponding to the actions performed by servo is the same as the ID corresponding to the command received.

When the servo determines that the second action command is not valid, the servo identifies the first action command as the command that it has been executed. Then the servo masks the second action command and no longer executes the second action command.

The servo further determines that the second action command is valid when the servo does not perform the actions corresponding to the first action command.

When the servo does not perform the actions corresponding to the first action command, the servo is identified as a servo that it does not receive the first action command, and then the servo determines that the second action command is valid. When the servo determines that the second action command is valid, the servo will perform the actions corresponding to the second action command.

In the present embodiment, when a first action command is received from the main controller via serial data bus, the servo acquires a preset delay time. The multi-servo feedback control system includes the main controller and the plurality of servos. Each servo corresponds to the different preset delay time. The servo sends feedback information to the main controller according to the preset delay time. The feedback information is used to identify work status of the servo. Each servo of the multi-servo feedback control system corresponds to the different preset delay time, and the servo sends feedback information to the main controller according to the corresponding preset delay time, and therefore the bus conflict of the multi-servo feedback control system can be avoided.

After the second action command was received, the servo determines whether the second action command is valid. The servo executes the second action command when the second action command is valid, and masks the second action command when the second action command is not valid. The second action command is the same as the first action command, so the servo can perform the actions corresponding to the first action command again when the servo has not received the first action command, and the servo no longer performs the actions corresponding to the first action command when the first action command has been executed by the servo. Therefore, accuracy and instantaneity of communication, are improved.

Embodiment 4

Figure 5:
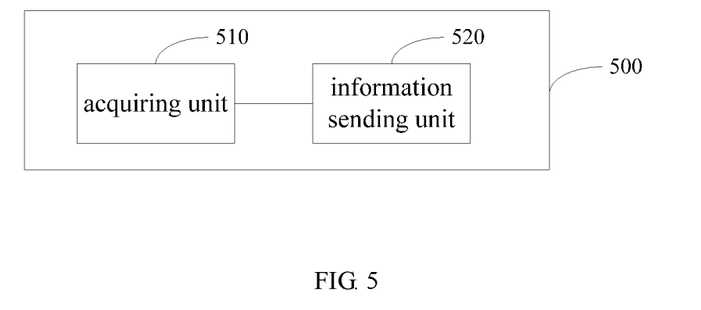
FIG. 5 is a schematic diagram of a fourth embodiment of a servo in accordance with the present disclosure.

Referring to FIG. 5, a schematic diagram of a fourth embodiment of a servo in accordance, with the present disclosure. In the present embodiment, each unit included in the servo is used to perform the steps corresponding to FIG. 3. For more information about implementation process, see FIG. 3 and the embodiment corresponding to FIG. 3. In the present embodiment, the servo 500 includes an acquiring unit 510 and an information sending unit 520.

The multi-servo feedback control system includes the main controller and the plurality of servos. The acquiring unit 510 acquires a preset delay time when the servo receives a first action command from the main controller. Each servo corresponds to a different preset delay time. The acquiring unit 510 sends the preset delay time acquired to the information sending unit 520.

The information sending unit 520 receives the preset delay time from the acquiring unit 510 and sends feedback information to the main controller according to the preset delay time, wherein the feedback information is used to identify work status of the servo.

In the present embodiment, when a first action command is received from the main controller via serial data bus, the servo acquires a preset delay time. The multi-servo feedback control system includes the main controller and the plurality of servos. Each servo corresponds to the different preset delay time. The servo sends feedback information to the main controller according to the preset delay time. The feedback information is used to identify work status of the servo. Each servo of the multi-servo feedback control system corresponds to the different preset delay time, and the servo sends feedback information to the main controller according to the corresponding preset delay time, and therefore the bus conflict of the multi-servo feedback control system can be avoided.

Referring to FIG. 5 again. In another embodiment, each unit included in the servo is further used to perform the steps corresponding to FIG. 4. For more information about implementation process, see FIG. 4 and the embodiment corresponding to FIG. 4. In the present embodiment, the servo 500 includes an acquiring unit 510 and an information sending unit 520.

The multi-servo feedback control system includes the main controller and the plurality of servos. The acquiring unit 510 acquires a preset delay time when the servo receives a first action command from the main controller. Each servo corresponds to a different preset delay time. The acquiring unit 510 sends the preset delay time acquired to the information sending unit 520.

The information sending unit 520 receives the preset delay time from the acquiring unit 510 and sends feedback information to the main controller according to the preset delay time, wherein the feedback information is used to identify work status of the servo.

The information sending unit 520 further receives a second action command and determines whether the second action command is valid. The main controller sends the second action command when the feedback information has not been fully received from all the servos within a preset time period after the first action command was sent. The second action command is the same as the first action.

The information sending unit 520 further sends feedback information to the main controller according to the preset delay time when the second action command is valid.

The information sending unit 520 further receives the second action command and determines whether the servo is performing actions corresponding to the first action command.

The information sending unit 520 further determines that the second action command is not valid and then masks the second action command when the servo is performing actions corresponding to the first action command.

The information sending unit 520 further determines that the second action command is valid when the servo does not perform the actions corresponding to the first action command.

In the present embodiment, when a first action command is received from the main controller via serial data bus, the servo acquires a preset delay time. The multi-servo feedback control system includes the main controller and the plurality of servos. Each servo corresponds to the different preset delay time. The servo sends feedback information to the main controller according to the preset delay time. The feedback information is used to identify work status of the servo. Each servo of the multi-servo feedback control system corresponds to the different preset delay time, and the servo sends feedback information to the main controller according to the corresponding preset delay time, and therefore the bus conflict of the multi-servo feedback control system can be avoided.

After the second action command was received, determining whether the second action command is valid. Executing the second action command when the second action command is valid, and masking the second action command when the second action command is not valid. The second action command is the same as the first action command, so the servo can perform the actions corresponding to the first action command again when the servo has not received the first action command and the servo no longer performs the actions corresponding to the first action command when the first action command has been executed by the servo. Therefore, accuracy and instantaneity of communication are improved.

Embodiment 5

Figure 6:
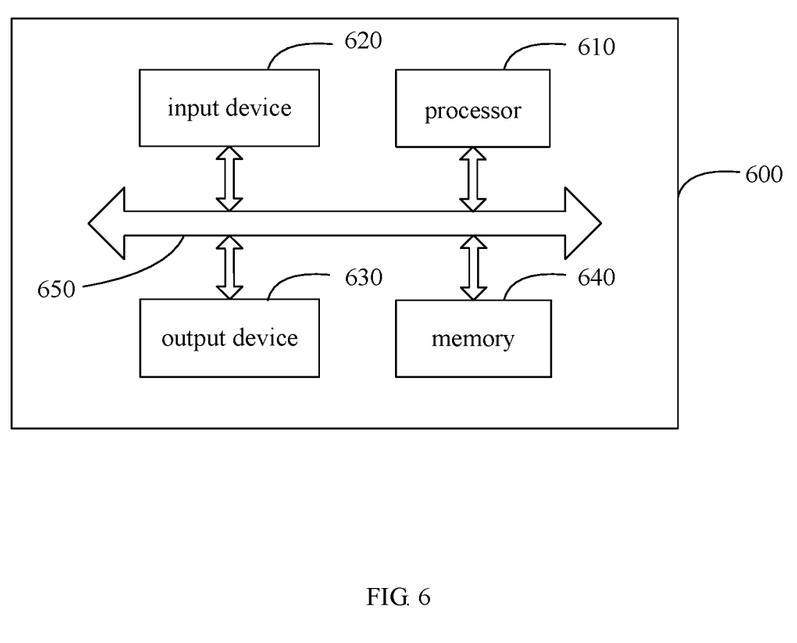
FIG. 6 is a schematic diagram of a fifth embodiment of a servo in accordance with the present disclosure.

Referring to FIG. 6, a schematic diagram of a fifth embodiment of a servo in accordance with the present disclosure. As shown in FIG. 6, in the present embodiment, the servo may include: one or more processors 610, one or more input devices 620, one or more output devices 630, a memory 640 and a main bus 650. The processors 610 and the input devices 620 and the output devices 630 and the memory 640 are connected via the main bus 650. The memory 640 is used to store commands. The processor 610 is used to execute commands that are stored in the memory 640.

The processor 610 performs the following steps according to the commands.

The processor 610 acquires a preset delay time and sends feedback information to the main controller according to the preset delay time when the servo receives a first action command from a main controller. The multi-servo feedback control system includes the main controller and the plurality of servos. Each servo corresponds to the different preset delay time. The feedback information is used to identify work status of the servo.

The processor 610 further receives a second action command and determines whether the second action command is valid. The main controller sends the second action command when the feedback information has not been folly received from all the servos within a preset time period after the first action command was sent. The second action command is same as the first action. The processor 610 sends feedback information to the main controller according to the preset delay time when the second action command is valid.

The processor 610 further receives a second action command and determines whether the servo is performing actions corresponding to the first action command. When the servo is performing the actions corresponding to the first action command, the processor 610 determines that the second action command is not valid and then masks the second action command.

When the servo does not perform the actions corresponding to the first action command, the processor 610 further determines that the second action command is valid.

It is understood that in the present embodiment, the processor(s) 610 may be a Central Processing Unit (CPU). The processors(s) 610 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine.

Memory 640 may include read only memory and random access memory, provides instructions and data to the processor 610. Portion of the memory 640 may also include non-volatile random access memory (NVRAM). For example, memory 640 further can be used to store device type information.

Implementation, the present invention as described in Example the processor 610, the input device 620, the output devices 630 and memory 640 can be used to perform steps of the command control in the multi-servo feedback control system provided by embodiments 1 and 2, and also perform implementation servo as described in the embodiment of the present invention, it is not discussed here.

Professionals should also be further appreciated that each coupling unit and algorithm steps described exemplary embodiments disclosed herein, it is possible in electronic hardware, computer software, or a combination of the two to achieve, in order to clearly illustrate the hardware and software interchangeability, the above description has been generally described the composition and function in accordance with the steps of the examples. These functions actually to be performed by hardware or software depends upon the particular application and design constraints technical solutions. Professional and technical personnel can use different methods for each particular application to implement the functions described herein, but such implementation should not be beyond the scope of the present invention.

Those skilled in the art can dearly understand that, for convenience and simplicity of description, specific work process and system elements described above, can refer cases to the corresponding method described in the preceding process, not repeat them here.

In the present application provides several embodiments, it should be understood that a servo and method disclosed may be implemented in other manners. For example, the apparatus described above is merely illustrative embodiment functions only as a logical functional division, the division may be additional ways actual implementation, for example, a plurality of units or components may be combined or it can be integrated into another system, or some features may be ignored, or not executed. Another point, displayed or coupled or directly coupled or communicating with each other may be connected through some discussion of the communication interface, or communication means or indirectly coupled connection means may be electrical, mechanical, or other forms.

Example steps of the present invention can adjust the order, merge and cut according to actual needs.

Example terminal unit of the present invention can be based on actual needs consolidation, division and exclusion.

As a separate component of the unit described may or may not be physically separated as part of the display unit may or may not be a physical unit, which can be located in one place, or may be distributed to multiple networks module. It can select some or all of the means to achieve the purpose of implementation of the program according to the embodiment of the actual needs.

In addition, in various embodiments of the present invention, in the functional units may be integrated in a processing unit, each unit may be a separate physical existence, may be two or more units integrated in one unit. The integrated unit described above can be used both implemented in the form of hardware, the software can also be used in the form of functional units realized.

If the function implemented in the form of software modules and as a standalone product sold or used, the terminal can be stored in a readable storage medium. Based on this understanding, the technical aspect of the present invention is essentially or portions of contribution to the art of the technology or program may be embodied in the form of software products, the software product is stored in a storage medium, including several instructions for making a terminal (mobile phone, IPAD, etc.) to perform all or part of the present invention, the method step example various embodiments. The aforementioned storage media include: U disk, removable hard disk, read-only memory 830 (RDM, Read_Only Memory), a random access memory (RAM, Random AccessMemory), and other various disk or CD-ROM can store program code medium.

The above is only a specific embodiment of the present invention, but the scope of the present invention is not limited thereto, and any skilled in the art in the art within the technical scope of the present invention disclosed, may easily occur to modify or replace the equivalent, modify or replace these should fall within the scope of the present invention. Accordingly, the scope of the present invention shall be subject to the scope of the claims.

What is claimed is:

1. A command control in a multi-servo feedback control system comprising a main controller and a plurality of servos electrically connected to the main controller, the command control comprising:

sending, from the main controller, a first action command to the servos via serial data bus, acquiring preset delay time by the servos, performing actions by the servos according to the first action command, and sending feedback information by the servos to the main controller after the preset delay time, wherein the preset delay time of the plurality of servos are different from each other, the feedback information is configured to identify work status of the servos;

sending, from the main controller, a second action command, and determining, by the servos, whether the second action command is valid;

in response to the actions corresponding to the first action command being not performed by one of the servos, determining that the second action command is valid, performing, by said one of the servos, actions corresponding to the second action command, and sending the feedback information to the main controller after the preset delay time; and in response to the actions corresponding to the first action command being performed by the servos, determining that the second action command is not valid, and masking the second action command, by the servos;

wherein the second action command is sent by the main controller, in response to the feedback information from any one of the servos are not fully received by the main controller within a preset time period after the first action command is sent.

2. The command control of claim 1, wherein the first action command contains identity information and action information of each of the plurality of servos, the step of performing actions by the servos according to the first action command further comprises:

acquiring, by the servos, target action information corresponding to identity information of the servos contained in the first action command; and performing actions corresponding to the target action information.

3. The command control of claim 2, wherein the command control further comprises:

determining whether the servos are performing actions, by the servos;

in response to the servos are performing actions, determining whether a first identity information corresponding to the actions performed by the servos is the same as a second identity information corresponding to the servos contained in the first action command;

determining that the actions corresponding to the first action command is performed by the servos, in response to the first identity information being the same as the second identity information; and determining that the actions corresponding to the first action command is not performed by the servos, in response to the first identity information being not the same as the second identity information, or the servos are not performing the actions.

4. The command control of claim 1, wherein the second action command is the same as the first action command.

5. The command control of claim 1, wherein the work status of the servos comprises any of the following three status:

a first status, that the first action command has been received by the servos;

a second status, that the servos works properly and will perform the actions corresponding to the first action command;

a third status, that the servos do not perform the actions corresponding to the first action command.

6. The command control of claim 1, wherein the command control further comprises:

outputting, by the main controller, an error command, in response to the feedback information from any one of the servos are still not fully received by the main controller, when a number of times the second action command has been sent exceeds a preset alarm value.

7. The command control of claim 6, wherein the first action command is sent in a form of command frame, the error command is output by alarm with sound through a preset program or output by sending alarm information to an upper computer.

8. A servo used for a multi-servo feedback control system comprising a main controller and a plurality of servos electrically connected to the main controller, each of the servos comprising:

at least one processor, a storage system;

one or more programs that are stored in the storage system and are executed by the at least one processor, the one or more programs comprising:

an acquiring unit, configured for receiving a first action command from the main controller via serial data bus, acquiring preset delay time corresponding to the servo, and performing actions according to the first action command, wherein the preset delay time of the plurality of servos are different from each other;

an information sending unit, configured for sending feedback information to the main controller after the preset delay time, wherein the feedback information is configured to identify work status of the servo;

the information sending unit, further configured for receiving a second action command from the main controller, and determining whether the second action command is valid;

the information sending unit, further configured for determining that the second action command is valid, performing actions corresponding to the second action command, and sending the feedback information to the main controller after the preset delay time, in response to the actions corresponding to the first action command being not performed by the servo; and the information sending unit, further configured for determining that the second action command is not valid, and masking the second action command, in response to the actions corresponding to the first action command being performed by the servo;

wherein the second action command is sent by the main controller, in response to the feedback information from any one of the servos are not fully received by the main controller within a preset time period after the first action command is sent.

9. The servo of claim 8, wherein the acquiring unit is further configured for acquiring target action information corresponding to identity information of the servo contained in the first action command, and performing actions corresponding to the target action information.

10. The servo of claim 9, wherein the information sending unit is further configured for determining whether the servo is performing actions; determining whether a first identity information corresponding to the actions performed by the servo is the same as a second identity information corresponding to the servo contained in the first action command, in response to the servo being performing actions; determining that the actions corresponding to the first action command is performed by the servo, in response to the first identity information being the same as the second identity information; and determining that the actions corresponding to the first action command is not performed by the servo, in response to the first identity information being not the same as the second identity information, or the servo being not performing the actions.

11. The servo of claim 8, wherein the second action command is the same as the first action command.

12. The servo of claim 8, wherein the work status of the servo comprises any of the following three status:
- a first status, that the first action command has been received by the servo;
- a second status, that the servo works properly and will perform the actions corresponding to the first action command;
- a third status, that the servo does not perform the actions corresponding to the first action command.

13. The servo of claim 8, wherein the first action command is sent in a form of command frame.

14. A multi-servo feedback control system, the system comprising: a main controller and a plurality of servos; wherein
- the main controller comprises at least one communication interface, at least one of the at least one communication interface is connected in series with the plurality of servos;
- the main controller is configured for sending a first action command to the plurality of servos via serial data bus;
- the plurality of servos are configured for receiving the first action command from the main controller via serial data bus, acquiring preset delay time, performing actions according to the first action command, and sending feedback information to the main controller after the preset delay time, wherein the preset delay time of the plurality of servos are different from each other, the feedback information is configured to identify work status of the servos;
- the main controller is further configured for sending a second action command to the plurality of servos, in response to the feedback information from any one of the servos are not fully received by the main controller within a preset time period after the first action command is sent;
- the plurality of servos are further configured for receiving the second action command from the main controller, and determining whether the second action command is valid;
- in response to the actions corresponding to the first action command being not performed by one of the servos, said one of the servos is further configured for determining that the second action command is valid, performing actions corresponding to the second action command, and sending the feedback information to the main controller after the preset delay time; and
- the plurality of servos are further configured for determining that the second action command is not valid, and masking the second action command, in response to the actions corresponding to the first action command being performed by the servos.

15. The system of claim 14, wherein the first action command contains identity information and action information of each of the plurality of servos;
- the plurality of servos are further configured for acquiring target action information corresponding to identity information of the servos contained in the first action command, and performing actions corresponding to the target action information.

16. The system of claim 15, wherein the plurality of servos are further configured for determining whether the servos are performing actions; determining whether a first identity information corresponding to the actions performed by the servos is the same as a second identity information corresponding to the servos contained in the first action command, in response to the servos are performing actions; determining that the actions corresponding to the first action command is performed by the servos, in response to the first identity information being the same as the second identity information; and determining that the actions corresponding to the first action command is not performed by the servos, in response to the first identity information being not the same as the second identity information, or the servos are not performing the actions.

17. The system of claim 16, wherein the main controller is further configured for outputting an error command, in response to the feedback information from any one of the servos are still not fully received by the main controller, when a number of times the second action command has been sent exceeds a preset alarm value; the first action command is sent in a form of command frame; and the error command is output by alarm with sound through a preset program or output by sending alarm information to an upper computer.

18. The system of claim 14, wherein the second action command is the same as the first action command.

19. The system of claim 14, wherein the work status of the servo comprises any of the following three status:
- a first status, that the first action command has been received by the servos;
- a second status, that the servos works properly and will perform the actions corresponding to the first action command;
- a third status, that the servos do not perform the actions corresponding to the first action command.

* * * * *